US010129707B2

(12) United States Patent
Seacat DeLuca et al.

(10) Patent No.: US 10,129,707 B2
(45) Date of Patent: Nov. 13, 2018

(54) AUTOMATICALLY NAVIGATING A MOBILE DEVICE TO A PARTICULAR ELECTRONIC PAGE BASED ON A USER'S LOCATION WITHIN A VENUE

(71) Applicant: International Business Machines Corporation, Armonk, NY (US)

(72) Inventors: Lisa Seacat DeLuca, Baltimore, MD (US); Shelbee D. Smith-Eigenbrode, Thornton, CO (US); Dana L. Price, Surf City, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/697,160

(22) Filed: Sep. 6, 2017

(65) Prior Publication Data

US 2017/0366942 A1 Dec. 21, 2017

Related U.S. Application Data

(63) Continuation of application No. 14/951,850, filed on Nov. 25, 2015, now Pat. No. 9,763,057.

(51) Int. Cl.
*H04W 64/00* (2009.01)
*H04W 4/04* (2009.01)
*H04L 29/08* (2006.01)
*G06Q 30/06* (2012.01)

(52) U.S. Cl.
CPC .......... *H04W 4/04* (2013.01); *G06Q 30/0623* (2013.01); *H04L 67/02* (2013.01); *H04L 67/18* (2013.01)

(58) Field of Classification Search
CPC .......... H04W 4/04; H04L 67/02; H04L 67/18; G06C 30/0623
USPC ............................................ 455/456.1–456.3
See application file for complete search history.

(56) References Cited

U.S. PATENT DOCUMENTS

| 6,785,551 | B1 | 8/2004 | Richard |
| 7,573,843 | B2 | 8/2009 | Koss |
| 9,763,057 | B2 | 9/2017 | DeLuca et al. |
| 2002/0115453 | A1 | 8/2002 | Poulin |

(Continued)

FOREIGN PATENT DOCUMENTS

WO 2011116381 A1 9/2011

*Primary Examiner* — Nathan Taylor
(74) *Attorney, Agent, or Firm* — Cuenot, Forsythe & Kim, LLC

(57) ABSTRACT

A location of a user within a venue can be determined by determining a location of a mobile device of the user within the venue. A user interaction with the mobile device while the user is located within the venue can be detected. Responsive to detecting the user interaction with the mobile device while the user is located within the venue, a sub-section within the venue at, or within a predetermined distance to, the location of the user within the venue, or at least one event that takes place in the sub-section within the venue at, or within a predetermined distance to, the location of the user within the venue, can be identified. The mobile device can be automatically navigated to an electronic page containing information for the sub-section within the venue or information for the at least one event that takes place in the sub-section within the venue.

15 Claims, 4 Drawing Sheets

(56) References Cited

U.S. PATENT DOCUMENTS

| | | |
|---|---|---|
| 2003/0069029 A1 | 4/2003 | Dowling |
| 2004/0062213 A1 | 4/2004 | Koss |
| 2004/0116115 A1 | 6/2004 | Ertel |
| 2007/0225911 A1 | 9/2007 | Chanick |
| 2008/0214166 A1 | 9/2008 | Ramer |
| 2008/0288325 A1 | 11/2008 | Pavlov |
| 2009/0138439 A1 | 5/2009 | Yeung |
| 2009/0163228 A1 | 6/2009 | Blumberg |
| 2010/0023388 A1 | 1/2010 | Blumberg |
| 2010/0064007 A1 | 3/2010 | Randall |
| 2011/0029670 A1 | 2/2011 | Klein |
| 2013/0102248 A1* | 4/2013 | Jay .................. H04L 67/02 455/41.1 |
| 2013/0145276 A1 | 6/2013 | Sathish et al. |
| 2014/0078991 A1 | 3/2014 | Trotter |
| 2014/0195380 A1 | 7/2014 | Jamtgaard |
| 2014/0222531 A1* | 8/2014 | Jacobs .................. G06Q 50/01 705/14.5 |
| 2014/0344294 A1 | 11/2014 | Skeen |
| 2015/0105513 A1 | 4/2015 | Nickel |
| 2015/0112807 A1 | 4/2015 | Muppirala et al. |
| 2015/0120767 A1 | 4/2015 | Skeen |
| 2015/0206187 A1 | 7/2015 | Kholia |
| 2015/0233715 A1 | 8/2015 | Xu |
| 2015/0355893 A1 | 12/2015 | Luk |
| 2016/0241708 A1 | 8/2016 | Abraham et al. |
| 2016/0352673 A1 | 12/2016 | Flores et al. |
| 2017/0034289 A1 | 2/2017 | Theobald |
| 2017/0150323 A1 | 5/2017 | DeLuca et al. |

\* cited by examiner

400

```
┌─────────────────────────────────────────────────────────────────┐
│ Determine a location of a user within a venue by determining a  │
│              location of a mobile device of the user within     │
│              the venue                                          │
│                              405                                │
└─────────────────────────────────────────────────────────────────┘
                                │
                                ▼
┌─────────────────────────────────────────────────────────────────┐
│ Detect a user interaction with the mobile device while the user │
│              is located within the venue                        │
│                              410                                │
└─────────────────────────────────────────────────────────────────┘
                                │
                                ▼
┌─────────────────────────────────────────────────────────────────┐
│ Responsive to detecting the user interaction with the mobile    │
│ device while the user is located within the venue, identify a   │
│ sub-section within the venue at, or within a predetermined      │
│ distance to, the location of the user within the venue or at    │
│ least one event that takes place in the sub-section within the  │
│ venue at, or within a predetermined distance to, the location   │
│ of the user within the venue                                    │
│                              415                                │
└─────────────────────────────────────────────────────────────────┘
                                │
                                ▼
┌─────────────────────────────────────────────────────────────────┐
│ Automatically navigate, using a processor, the mobile device to │
│ an electronic page containing information for the sub-section   │
│ within the venue or information for the at least one event that │
│ takes place in the sub-section within the venue                 │
│                              420                                │
└─────────────────────────────────────────────────────────────────┘
```

FIG. 4

AUTOMATICALLY NAVIGATING A MOBILE DEVICE TO A PARTICULAR ELECTRONIC PAGE BASED ON A USER'S LOCATION WITHIN A VENUE

BACKGROUND

The present invention relates to web-based communication and, more specifically, to providing to consumers information to enhance their shopping experiences.

The use of mobile devices (e.g., smart phones and tablet computers) has grown significantly over the last decade and now is commonplace throughout much of the world. Mobile devices now are used extensively by users to access the Internet and perform a variety of functions that traditionally were performed using desktop computer and laptop computers. This provides a significant level of convenience to the users. For example, users can browse the Internet using their mobile devices while strolling through a store.

SUMMARY

A method includes determining a location of a user within a venue by determining a location of a mobile device of the user within the venue. The method also can include detecting a user interaction with the mobile device while the user is located within the venue. The method also can include, responsive to detecting the user interaction with the mobile device while the user is located within the venue, identifying a sub-section within the venue at, or within a predetermined distance to, the location of the user within the venue or at least one event that takes place in the sub-section within the venue at, or within a predetermined distance to, the location of the user within the venue. The method also can include automatically navigating, using a processor, the mobile device to an electronic page containing information for the sub-section within the venue or information for the at least one event that takes place in the sub-section within the venue.

A system includes a processor programmed to initiate executable operations. The executable operations include determining a location of a user within a venue by determining a location of a mobile device of the user within the venue. The executable operations also can include detecting a user interaction with the mobile device while the user is located within the venue. The executable operations also can include, responsive to detecting the user interaction with the mobile device while the user is located within the venue, identifying a sub-section within the venue at, or within a predetermined distance to, the location of the user within the venue or at least one event that takes place in the sub-section within the venue at, or within a predetermined distance to, the location of the user within the venue. The executable operations also can include automatically navigating the mobile device to an electronic page containing information for the sub-section within the venue or information for the at least one event that takes place in the sub-section within the venue.

A computer program includes a computer readable storage medium having program code stored thereon. The program code is executable by a processor to perform a method. The method includes determining, by the processor, a location of a user within a venue by determining a location of a mobile device of the user within the venue. The method also can include detecting, by the processor, a user interaction with the mobile device while the user is located within the venue. The method also can include, responsive to detecting the user interaction with the mobile device while the user is located within the venue, identifying, by the processor, a sub-section within the venue at, or within a predetermined distance to, the location of the user within the venue or at least one event that takes place in the sub-section within the venue at, or within a predetermined distance to, the location of the user within the venue. The method also can include automatically navigating, by the processor, the mobile device to an electronic page containing information for the sub-section within the venue or information for the at least one event that takes place in the sub-section within the venue.

BRIEF DESCRIPTION OF THE DRAWINGS

FIG. 4 is a flow chart illustrating an example of a method of automatically navigating a mobile device to an electronic page.

DETAILED DESCRIPTION

Figure 1:
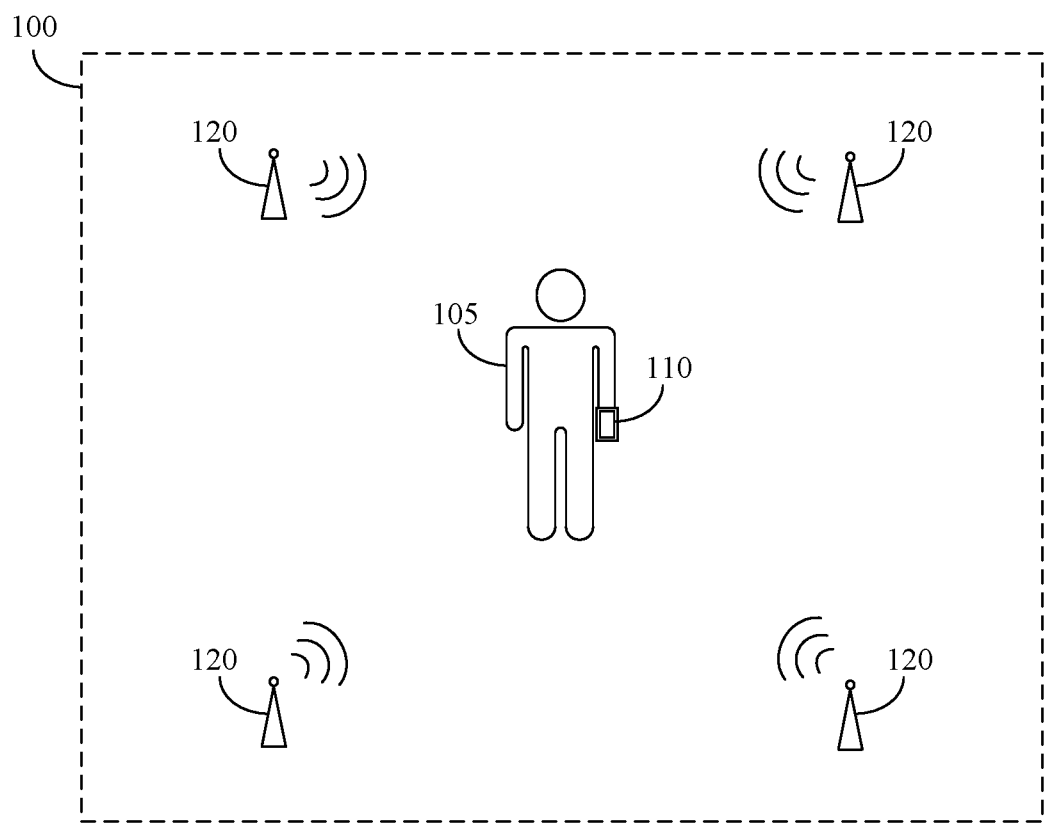
FIG. 1 is diagram illustrating implementation of a beacons within a venue.

This disclosure relates to web-based communication and, more specifically, to automatically navigating mobile devices to particular electronic pages.

In accordance with the arrangements described herein, one or more beacons or other devices/systems can determine a location of a user within a venue, for example by detecting commination signals generated by the user's mobile device. For instance, if a user is located in the shoe department of a store, the beacons can determine that the user is in that department. Similarly, if a user is located in a particular conference room at a convention center, the beacons can determine that the user is located in that conference room. The user's interaction with the mobile device also can be detected. For example the user navigating the mobile to a particular website, such as a landing page associated with the venue, can be detected. Responsive to detecting the user interaction with the mobile device while the user is located within the venue, a data processing system can identify information for one or more products offered for sale within the venue at or near the location of the user, or identify information for one or more events taking place in the venue at or near the location of the user. Further, the data processing system can automatically navigate the web browser or mobile application of the user's mobile device to a web page associated with the products or event, which may be of interest to the user.

Thus, the user need not spend a lot of time navigating to the web page. Instead, if the user interacts with the mobile device while in a shoe department, a web page containing information related to the shoes in that department can be automatically loaded on the user's mobile device, which greatly simplifies the user's shopping experience. Similarly, if the user launces the web browser or mobile application while attending a conference, a web page containing information related to that conference can be automatically loaded on the user's mobile device, which can simplify the process the user goes through to access information related to that conference.

Several definitions that apply throughout this document now will be presented.

As defined herein, the term "location" means a place within a venue where a user may be physically present.

As defined herein, the term "venue" means a place that physically exists in the real world, such as a building. Examples of venues include, but are not limited to, stores, malls, convention centers, amusement parks and the like. As the term "venue" is defined herein, an on-line store is not a venue.

As defined herein, the term "near" means within a predetermined distance.

As defined herein, the term "user" means a person (i.e., a human being).

As defined herein, the term "mobile device" means a wireless processing device including at least one processor, memory elements, and at least one transceiver (or transmitter/receiver pair) configured to wirelessly communicate data. Examples of a mobile device include, but are not limited to, a tablet computer and a smart phone.

As defined herein, the term "web browser" means an application configured to retrieve webpages via a network, such as the Internet, and present the webpages on a display.

As defined herein, the term "electronic page" means a document written using HyperText Markup Language (HTML) and accessible via the Internet. Other languages also can be used in addition to HTML to create an electronic page. An electronic page may contain text, images, sound, video and/or hyperlinks. An example of an electronic page is a webpage.

As defined herein, the term "mobile application" means an application specifically configured to be executed by a processor of a mobile device.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

FIG. 1 is diagram illustrating implementation of a beacons within a venue 100. The presence of one or more mobile devices, such as a mobile device 110 used by a user 105, within the venue 100, and the specific locations of the mobile devices 110 within the venue 100, can be detected by one or more beacons 120 (or other electronic devices or systems). In this regard, the location of the mobile device 110 can indicate the location of the user 105 using the mobile device 110.

In illustration, one or more beacons 120 can be deployed within the venue 100 to detect whether mobile devices 110 are present in the venue 100, and detect the locations of the mobile devices 110 within the venue 100. A beacon 120 can include a transceiver that transmits a wireless beacon signal. In illustration, the beacon 120 can include a Bluetooth® low-energy (BLE) transmitter or transceiver that transmits the beacon signal. In one arrangement, the beacon signal can include a universally unique identifier (UUID), which is an identifier that is unique to the beacon 120. The major value can be a value that identifies a local group of beacons that includes the beacon 120, for example if more than one beacon 120 is deployed within the venue 100. The minor value can identify the beacon 120 within the local group of beacons 120.

When a mobile device 110 is in range of a beacon 120, the mobile device 110 can detect the beacon signal, for example via a BLE receiver or transceiver. The mobile device 110 can process the beacon signal, for example using a suitably configured application, to determine (or estimate) a distance of the mobile device 110 to the beacon 120. The mobile device 110 can determine (or estimate) the distance, for example, based on a strength of the received signal. The mobile device 110 can wirelessly communicate to the beacon 120 a response to the beacon signal. The response can indicate the determined (or estimated) distance of the mobile device 110 from the beacon 120. The response also can include a user identifier associated with the user of the mobile device 110, a media access control (MAC) address of the mobile device 110, or the like.

In another arrangement, in lieu of, or in addition to, use of the beacons 120, one or more access points, for example access points configured to communicate in accordance with an IEEE 802.11 communication protocol (e.g., WiFi™), can be used to determine the presence and location of the user within the venue 100. An access point can be implemented as a wireless router or switch or as a stand-alone wireless access point communicatively linked to a router or switch. In illustration, the mobile device 110 can exchange signals/messages with a data processing system communicatively linked to the access points, for example an automated page navigation server (shown in FIG. 2), and the data processing system can determine (or estimate) the distance of the mobile device 110 from one or more of the access points using techniques known in the art.

In another example, the mobile device 110 can include a global positioning system (GPS) receiver, and the mobile device can communicate GPS location data to the data processing system, which the data processing system can use to determine the location of the user 105. In other arrangements, the mobile device 110 can communicate with one or more cellular base transceiver stations (BTSs), cellular microcells, or the like, and the location of the mobile device 110 within the venue 100 can be determined based on data generated by the mobile devices GPS receiver and/or other techniques known in the art. Hereinafter, reference will be made to the use of beacons 120 to determine the user's location within the venue 100, but it will be understood that such determination can be made using access points, cellular BTSs, cellular microcells or the like.

Figure 2:
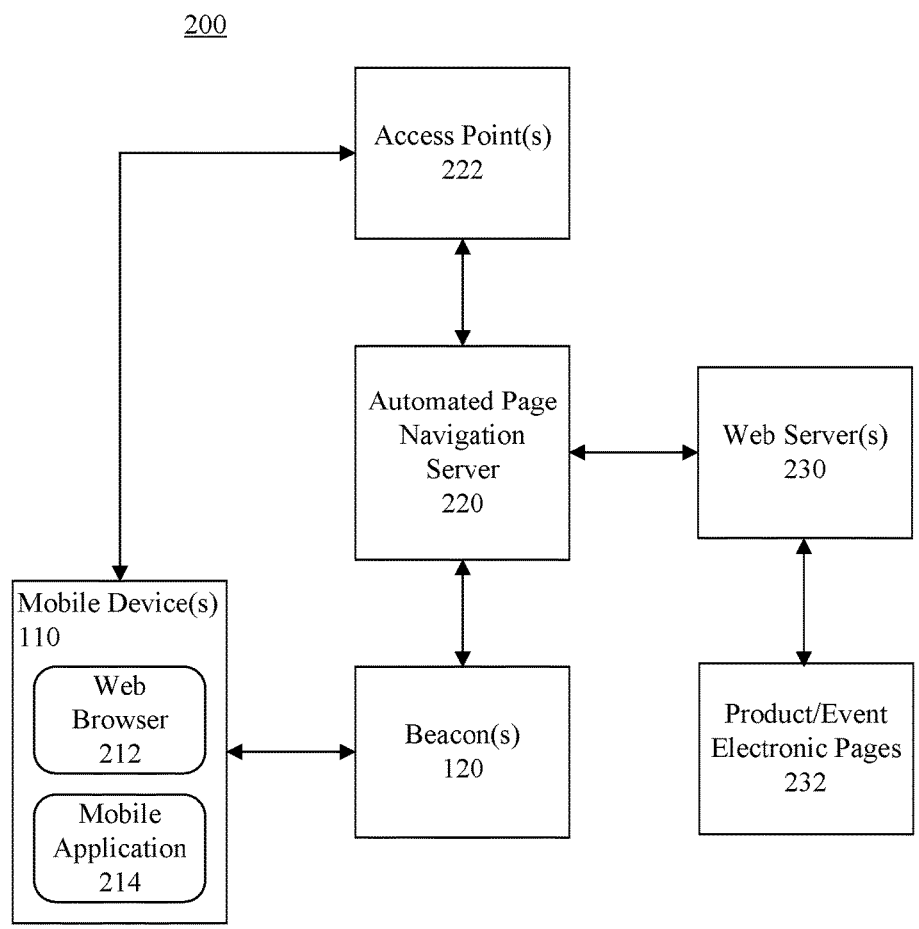
FIG. 2 is a block diagram illustrating an example of a communication system.

FIG. 2 is a block diagram illustrating an example of a communication system (hereinafter "system") 200. The system 200 can include an automated page navigation server 220, one or more access points 222 and, in an arrangement in which the beacons 120 are used to determine the user's location, the beacons 120. The automated page navigation server 220 can be communicatively linked to the beacon(s) 120 and detect the present physical location of one or more mobile devices, such as a mobile device 110, within the venue based on data received from the beacon(s) 120. For example, based on the determined (or estimated) distance of the mobile device 110 from the beacon 120, and the UUID, major value and/or minor value assigned to that beacon 120, the automated page navigation server 220 can determine whether the mobile device 110 is present in the venue, and the location in the venue where the mobile device 110 presently is located. For instance, the automated page navigation server 220 can determine to which beacon 120 the mobile device 110 is closest, and the distance, or estimated distance, of the mobile device 110 from that beacon 120. Moreover, based on information received from at least two beacons 120, the automated page navigation server 220 can implement trilateration to determine the location of the mobile device 110. In another arrangement, the automated page navigation server 220 can receive GPS information from the mobile device 110 to determine the mobile device's location. Such information can be received via one or more access points and/or routers to which the mobile device 110 is communicatively linked.

Regardless of how the automated page navigation server 220 determines the location of the mobile device 110, the automated page navigation server 220 can store corresponding location information to one or more memory elements within or communicatively linked to the automated page navigation server, for example to a data table. Further, the automated page navigation server 220 can store with the location information an identifier that identifies the user and/or the mobile device 110. Such identifier can be a user identifier, the MAC address of the mobile device, or the like.

While the user is located in the venue, the mobile device 110 can be communicatively linked to one or more access points 222 connected to a local area network (LAN) or a wide area network (WAN) providing Internet connectivity. Via the access point(s) 222, the mobile device 110 can connect to the LAN or WAN. When connecting to the LAN or WAN, the mobile device 110 can be assigned an internet protocol (IP address) to identify the mobile device 110 on the LAN or WAN.

In an arrangement in which the beacons 120 are used to determine the location of the mobile device 110, responsive to connecting to the LAN or WAN, the mobile device 110 can communicate the identifier that identifies the user and/or the mobile device 110 (e.g., the user identifier or the MAC address). For example, an application executing on the mobile device 110 can be configured to communicate the identifier, which the access point 222 can route to the automated page navigation server 220. In another example, a web browser 212 or mobile application 214 installed on the mobile device can be configured to communicate the identifier responsive to being launched. For example a plug-in for the web browser 212 or an application programming interface (API) used by the web browser 212 can be installed on the mobile device 110. In another example, the mobile application 214 can be pre-configured to communicate the identifier, for example if the mobile application 214 is provided by an entity associated with the venue (e.g., a mobile application provided by a retailer or event hosting company). The automated page navigation server 220 can process the identifier to associate the IP address assigned to the mobile device 110 with the location information identifying the location of the mobile device 110.

In an arrangement in which the access point(s) 222 are used to determine the location of the mobile device 110, however, such step may not be necessary. For example, rather than using a user identifier or MAC address of the mobile device, the automated page navigation server 220 can associate the location information generated for the mobile device 110 with the IP address assigned to the mobile device 110 when the location information is generated. The automated page navigation server 220 can store the IP address and location information to the memory elements, for example to the previously mentioned data table.

The automated page navigation server 220 can be configured to monitor communications (e.g., data packets) communicated by the mobile device 110 via the access point(s) 222. At some time while the user is located in the venue, the user may choose to interact with the mobile device 110 in a manner that causes the mobile device 110 to access the Internet via an access point 222. The automated page navigation server 220 can detect such user interaction. For example, the user may attempt to navigate the mobile device 110 (e.g., a web browser 212 or mobile application 214 installed on the mobile device 110) to a particular website, for example a website associated with the venue (e.g., a landing page). In response, the mobile device 110 can communicate one or more requests to access the electronic page, for example by specifying in the request a uniform resource locator (URL) of the electronic page. The automated page navigation server 220 can intercept such request. Responsive to intercepting the request, instead of propagating the request to the specified URL, the automated page navigation server 220 can parse the request to identify the IP address of the mobile device 110 which sent the request. The automated page navigation server 220 can, using the IP address, query the location information stored in one or more memory elements to access the present location of the mobile device 110 within the venue.

In the case that the venue is a store, the automated page navigation server 220 can access one or more other data tables to identify one or more products being offered for sale (e.g., displayed) in a sub-section within the venue at or near the user's present location within the venue, and identify a URL for an electronic page 232 containing information for the one or more products. The electronic page 232 can, for example, be an electronic page of the store's website. The automated page navigation server 220 can automatically navigate the mobile device 110 to that electronic page 232. For example, the automated page navigation server 220 can replace the URL specified in the request with the URL for the electronic page 232, and propagate the request to the URL for that electronic page 232 to the web server 230 in a conventional manner, for example via the Internet, a LAN and/or a WAN. In another example, the automated page navigation server 220 can generate a new request to access the electronic page 232 on behalf of the mobile device 110. In this regard, the new request can be structured to indicate as a return address the IP address assigned to the mobile device 110 so that one or more responses to the request are routed to the mobile device 110. In a further example, the automated page navigation server 220 can be configured to operate as the web server 230, thus providing both automated electronic page navigation and hosting the store's website. In this case, the automated page navigation server 220 can return to the mobile device 110 the electronic page 232 containing information for the one or more products in lieu of the electronic page identified by the URL contained in the request received from the mobile device 110.

In the case that the venue is where one or more events are being hosted, the automated page navigation server 220 can access one or more other data tables to identify an event that takes place in a sub-section within the venue at or near the user's present location within the venue, and identify a URL for an electronic page 232 containing information for the that event. The electronic page 232 can, for example, be an electronic page of a website for an entity hosting the event.

As noted, the automated page navigation server 220 can automatically navigate the mobile device 110 to that electronic page 232, for instance in accordance with one or more of the examples described above.

Further, the automated page navigation server 220 can continue monitoring additional request generated by the mobile device 110. Responsive to the automated page navigation server 220 identifying another request generated by the mobile device 110 specifying a routing URL assigned to a particular electronic page associated with the venue (e.g., a landing page), instead of propagating the request to the specified URL or providing the electronic page specified by that URL, the automated page navigation server 220 can automatically navigate the mobile device 110 to the electronic page for the product(s) or event as previously described.

In view of the foregoing, rather than searching the website associated with the venue to find the electronic page 232 that has the information the user desires, the automated page navigation server 220 can automatically navigate the mobile device 110 to the proper electronic page 232. Thus, rather than having to begin at a landing page, and from there search for specific electronic pages 232 containing information on the sub-section within the venue (e.g., products displayed in the sub-section) in which the user is interested or an event the user is attending, the user's mobile device 110 can be automatically directed to the proper electronic pages 232. This can save the user much time and, perhaps, frustration trying to access information related to products or events in which the user is interested.

In a further aspect of the present arrangements, responsive to intercepting the request, the automated page navigation server 220 can communicate a response to the mobile device 110. The response include a message to the user prompting the user to indicate whether he/she chooses the mobile device to be automatically navigated to the electronic page 232 pertaining to the sub-section within the venue or the event, and/or whether the user desires additional information pertaining to one or more products offered for sale at the location in the venue where the user presently is located. The response can be configured to be processed by the web browser 212 or mobile application 214 to present the message to the user, and include user selectable buttons or icons to accept the offer for automatic navigation or reject such offer. Responsive to the user indicating that he/she does not choose the mobile device to be automatically navigated to the electronic page 232, or does not desire additional information about the products, the automated page navigation server 220 can allow the mobile device 110 to navigate to the electronic page indicated by the URL contained in the request. On the other hand, responsive to the user indicating that he/she does choose the mobile device to be automatically navigated to the electronic page 232, or desires the additional information, the automated page navigation server 220 can navigate the mobile device 110 to the electronic page 232 as previously described.

In one arrangement, the automated page navigation server 220 can prompt the user to indicate whether the user's indication should be saved. For example, the automated page navigation server 220 can communicate a message to the mobile device 110, and the mobile device 110 can present the message to the user. If the user elects to have that indication saved, the automated page navigation server 220 can store a parameter representing the indication with the previously described location information of the mobile device 110.

The user may roam around the venue. As the user roams, the user's location information can be continually or periodically updated. If a saved parameter indicating that the user does not want the mobile device to be automatically navigated to the electronic pages 232 is not stored with the location information, the automated page navigation server 220 can perform the above processes each time the mobile device 110 sends a request to access the landing page of the store's website or the landing page of the website hosting the event. Thus, the electronic page(s) 232 to which the mobile device 110 navigates can always be relevant to the sub-section within the venue or the event in which the user has interest.

In another aspect of the present arrangements, the automated page navigation server 220 can monitor how long the mobile device 110 is located in the venue and/or how long the mobile device 110, and thus the user, is present at a particular location in the venue. The automated page navigation server 220 can generate contextual information based on such monitoring. The automated page navigation server 220 can process the contextual information and the location information and, based on such processing, make determinations as to whether to automatically navigate the mobile device to the electronic page(s) 232 or to prompt the user to indicate whether the user would like to have the mobile device automatically navigated to the electronic page(s) 232.

In illustration, if the user uses the web browser 212 or mobile application 214 immediately when entering the store, or while the user continues to roam around the store, the automated page navigation server 220 need not perform the automatic navigation. In this regard, the user may not yet have arrived at a sub-section within the venue where products of interest to the user are located. For example, the user may be walking through a houseware sub-section of the store, but may not have interest in purchasing houseware. By making determinations regarding automatic navigation to the electronic page(s) 232 based on the contextual information, the risk of the service provided by the automated page navigation server 220 being perceived by the user as being a nuisance can be mitigated.

Nonetheless, if the user spends a significant amount of time at a location in particular sub-section within the venue, this can indicate that the user has interest in that sub-section (e.g., products offered for sale that are displayed in that sub-section). Such interest can be inferred from the contextual information, and the automated page navigation server 220 can perform, or offer to perform, the automatic navigation of the mobile device 110 to an electronic page 232 containing information for the sub-section (e.g., products in that location). In illustration, the automated page navigation server 220 can determine a duration of time that the user is present at the location in the sub-section within the venue. Responsive to the duration of time exceeding a threshold value (e.g., more than one minute, two minutes, three minutes, five minutes, or the like), the automated page navigation server 220 can identify the product displayed at that location that is offered for sale, and navigate the mobile device 110 to an electronic page 232 containing information for that product.

Additional contextual information can be received by the automated page navigation server 220 regarding specific products displayed in a store, for example by an administrator of the automated page navigation server 220 or a manager of the store. Such contextual information can indicate products prominently displayed in different locations around the store. For example, a large television can be prominently displayed in an electronics department. If the location information for the mobile device 110 and the location related contextual information indicates that the user stands in front of that television for a significant amount of time, the automated page navigation server 220 can infer that the user has interest in that television. Thus, an electronic page 232 selected by the automated page navigation server 220 to which to automatically navigate the mobile device 110 can be an electronic page presenting information about that television.

Further, the selected electronic page 232 can be an electronic page for which a link to the electronic page is not provided in a venue's website. For example, the electronic page 232 can be only accessible by the mobile device 110 if the mobile device 110 is automatically navigated to the electronic page 232 by the automated page navigation server 220 responsive to the automated page navigation server 220 detecting the user interaction with the mobile device 110 while the user is located within the venue. Such electronic page 232 can indicate and/or highlight special offers and/or coupons for users who are presently located in the venue. For example, if the user is presently located at a location in a sub-section of the store where televisions are displayed, the selected electronic page 232 can present one or more special offers and/or coupons on television purchases. Moreover, the electronic page 232 can indicate that the special offers and/or coupons are for a limited time, for example over the next hour, two hours, three hours, or the like. This can influence users to make immediate purchases of products they otherwise may put off making, which can help to increase the store's revenues.

Figure 3:
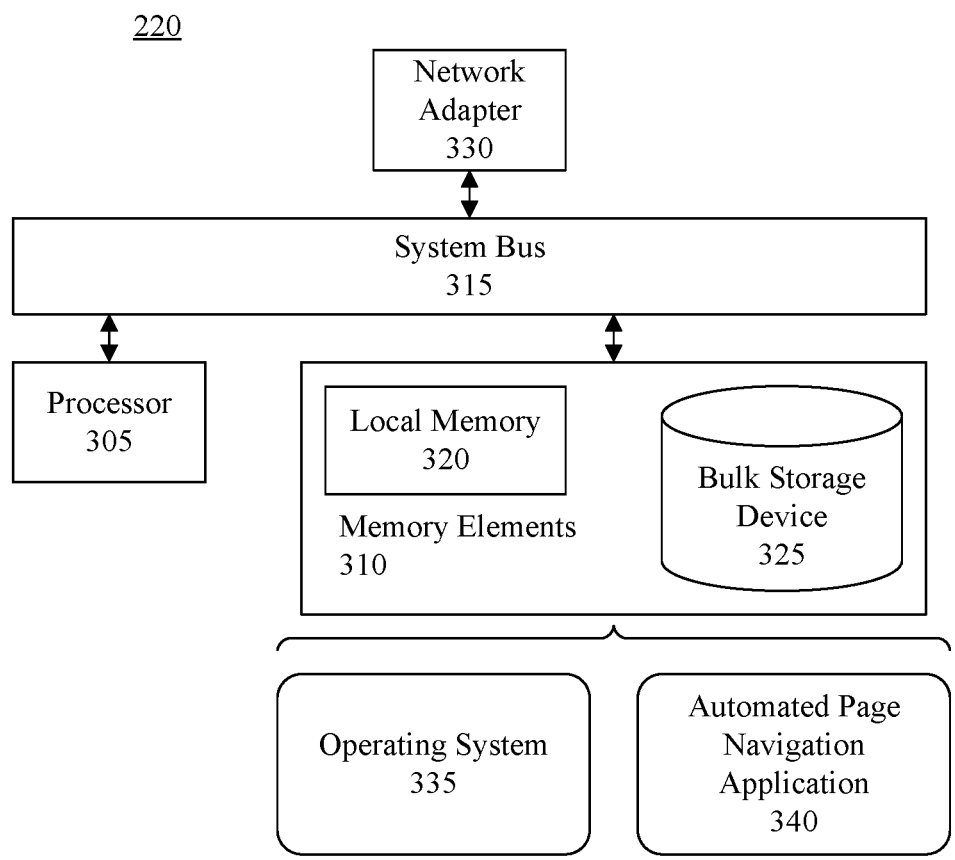
FIG. 3 is a block diagram illustrating example architecture for a data processing system.

FIG. 3 is a block diagram illustrating example architecture for the automated page navigation server 220. The automated page navigation server 220 can include at least one processor 305 (e.g., a central processing unit) coupled to memory elements 310 through a system bus 315 or other suitable circuitry. As such, the automated page navigation server 220 can store program code within the memory elements 310. The processor 305 can execute the program code accessed from the memory elements 310 via the system bus 315. It should be appreciated that the automated page navigation server 220 can be implemented in the form of any system including a processor and memory that is capable of performing the functions and/or operations described within this specification. For example, the automated page navigation server 220 can be implemented as one or more hardware servers.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The automated page navigation server 220 also can include one or more cache memories (not shown) that provide temporary storage of at least some program code in order to reduce the number of times program code must be retrieved from the bulk storage device 325 during execution.

One or more network adapters 330 can be coupled to automated page navigation server 220 to enable the automated page navigation server 220 to become coupled to other systems, computer systems, remote printers, and/or remote storage devices through intervening private or public networks. Modems, cable modems, transceivers, and Ethernet cards are examples of different types of network adapters 330 that can be used with the automated page navigation server 220.

As pictured in FIG. 3, the memory elements 310 can store an operating system 335 and an automated page navigation application 340. Being implemented in the form of executable program code, the operating system 335 and the automated page navigation application 340 can be executed by the processor 305. For example, the processor can execute the automated page navigation application 340 within a computing environment provided by the operating system 335 in order to perform the processes described herein that are performed by the automated page navigation server 220. As such, the operating system 335 and the automated page navigation application 340 can be considered part of the automated page navigation server 220. Moreover, the operating system 335 and the automated page navigation application 340 are functional data structures that impart functionality when employed as part of the automated page navigation server 220. Further, the previously described location information and contextual information are functional data structures that impart functionality when processed by the automated page navigation server 220.

FIG. 4 is a flow chart illustrating an example of a method 400 of automatically navigating a mobile device to an electronic page. At step 405, an automated page navigation server can determine a location of a user within a venue by determining a location of a mobile device of the user within the venue. At step 410, the automated page navigation server can detect a user interaction with the mobile device while the user is located within the venue. At step 415, responsive to detecting the user interaction with the mobile device while the user is located within the venue, the automated page navigation server can identify a sub-section within the venue at, or within a predetermined distance to, the location of the user within the venue or at least one event that takes place in the sub-section within the venue at, or within a predetermined distance to, the location of the user within the venue. At step 420, based on the identified information, the automated page navigation server can automatically navigate the mobile device to an electronic page. The electronic page can contain information for the sub-section within the venue or information for the at least one event that takes place in the sub-section within the venue.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining a location of a user within a venue by determining a location of a mobile device of the user within the venue;
    detecting a user interaction with the mobile device while the user is located within the venue;
    responsive to detecting the user interaction with the mobile device while the user is located within the venue:
        identifying a sub-section within the venue at, or within a predetermined distance to, the location of the user within the venue;
        determining a duration of time the user is present at the location within the venue;
        responsive to determining that the duration of time the user is present at the location within the venue exceeds a threshold value, identifying at least one product that is offered for sale in the sub-section within the venue; and
    automatically navigating, using a processor, the mobile device to an electronic page comprising information pertaining to the at least one product that is offered for sale in the sub-section within the venue.

2. The method of claim 1, wherein the detected user interaction with the mobile device is an action by the user attempting to navigate a web browser or mobile application on the mobile device to a landing page associated with the venue.

3. The method of claim 1, further comprising:
    prompting the user to indicate whether the user chooses the mobile device to be automatically navigated to the electronic page comprising the information pertaining to the at least one product that is offered for sale in the sub-section within the venue;
    wherein automatically navigating, using the processor, the mobile device to the electronic page comprising the information pertaining to the at least one product that is offered for sale in the sub-section within the venue is responsive to the user indicating that the user chooses the mobile device to be automatically navigated to the electronic page.

4. The method of claim 1, further comprising:
    prompting the user to indicate whether the user desires additional information for the sub-section within the venue or additional information for at least one event that takes place in the sub-section of the venue; and
    responsive to the user indicating that the user desires the additional information, automatically navigating the mobile device to an electronic page containing the additional information for the sub-section within the venue or the additional information for the at least one event that takes place in the sub-section within the venue.

5. The method of claim 1, wherein determining the location of the mobile device of the user within the venue comprises:
    determining the location of the mobile device using at least one beacon, at least one access point, at least one cellular microcell or at least one cellular base transceiver station.

6. A system, comprising:
    a processor programmed to initiate executable operations comprising:
    determining a location of a user within a venue by determining a location of a mobile device of the user within the venue;
    detecting a user interaction with the mobile device while the user is located within the venue;
    responsive to detecting the user interaction with the mobile device while the user is located within the venue:
        identifying a sub-section within the venue at, or within a predetermined distance to, the location of the user within the venue;
        determining a duration of time the user is present at the location within the venue;
        responsive to determining that the duration of time the user is present at the location within the venue exceeds a threshold value, identifying at least one product that is offered for sale in the sub-section within the venue; and
    automatically navigating the mobile device to an electronic page comprising information pertaining to the at least one product that is offered for sale in the sub-section within the venue.

7. The system of claim 6, wherein the detected user interaction with the mobile device is an action by the user attempting to navigate a web browser or mobile application on the mobile device to a landing page associated with the venue.

8. The system of claim 6, the executable operations further comprising:
prompting the user to indicate whether the user chooses the mobile device to be automatically navigated to the electronic page comprising the information pertaining to the at least one product that is offered for sale in the sub-section within the venue;
wherein automatically navigating the mobile device to the electronic page comprising the information pertaining to the at least one product that is offered for sale in the sub-section within the venue is responsive to the user indicating that the user chooses the mobile device to be automatically navigated to the electronic page.

9. The system of claim 6, the executable operations further comprising:
prompting the user to indicate whether the user desires additional information for the sub-section within the venue or additional information for at least one event that takes place in the sub-section of the venue; and
responsive to the user indicating that the user desires the additional information, automatically navigating the mobile device to an electronic page containing the additional information for the sub-section within the venue or the additional information for the at least one event that takes place in the sub-section within the venue.

10. The system of claim 6, wherein determining the location of the mobile device of the user within the venue comprises:
determining the location of the mobile device using at least one beacon, at least one access point, at least one cellular microcell or at least one cellular base transceiver station.

11. A computer program product comprising a computer readable storage medium having program code stored thereon, the program code executable by a processor to perform a method comprising:
determining, by the processor, a location of a user within a venue by determining a location of a mobile device of the user within the venue;
detecting, by the processor, a user interaction with the mobile device while the user is located within the venue;
responsive to detecting the user interaction with the mobile device while the user is located within the venue:
identifying, by the processor, a sub-section within the venue at, or within a predetermined distance to, the location of the user within the venue;
determining, by the processor, a duration of time the user is present at the location within the venue;
responsive to determining that the duration of time the user is present at the location within the venue exceeds a threshold value, identifying, by the processor, at least one product that is offered for sale in the sub-section within the venue; and
automatically navigating, by the processor, the mobile device to an electronic page comprising information pertaining to the at least one product that is offered for sale in the sub-section within the venue.

12. The computer program product of claim 11, wherein the detected user interaction with the mobile device is an action by the user attempting to navigate a web browser or mobile application on the mobile device to a landing page associated with the venue.

13. The computer program product of claim 11, the method further comprising:
prompting the user to indicate whether the user chooses the mobile device to be automatically navigated to the electronic page comprising the information pertaining to the at least one product that is offered for sale in the sub-section within the venue;
wherein automatically navigating, by the processor, the mobile device to the electronic page comprising the information pertaining to the at least one product that is offered for sale in the sub-section within the venue is responsive to the user indicating that the user chooses the mobile device to be automatically navigated to the electronic page.

14. The computer program product of claim 11, the method further comprising:
prompting the user to indicate whether the user desires additional information for the sub-section within the venue or additional information for at least one event that takes place in the sub-section of the venue; and
responsive to the user indicating that the user desires the additional information, automatically navigating the mobile device to an electronic page containing the additional information for the sub-section within the venue or the additional information for the at least one event that takes place in the sub-section within the venue.

15. The computer program product of claim 11, wherein determining the location of the mobile device of the user within the venue comprises:
determining the location of the mobile device using at least one beacon, at least one access point, at least one cellular microcell or at least one cellular base transceiver station.

* * * * *